United States Patent [19]

Takikawa et al.

[11] Patent Number: 5,139,125

[45] Date of Patent: * Aug. 18, 1992

[54] TEMPERATURE SENSITIVE TYPE FLUID FAN COUPLING APPARATUS

[75] Inventors: Kazunori Takikawa; Yuichi Ono, both of Numazu; Hiroshi Inoue, Fuji, all of Japan

[73] Assignee: Usui Kokusai Sangyo Kaisha Limited, Japan

[*] Notice: The portion of the term of this patent subsequent to Jun. 30, 2009 has been disclaimed.

[21] Appl. No.: 718,024

[22] Filed: Jun. 20, 1991

[30] Foreign Application Priority Data

Jun. 21, 1990 [JP] Japan ................. 2-163177

[51] Int. Cl.$^5$ ............................................. F16D 31/00
[52] U.S. Cl. ............................................. 192/58 B; 192/82 T
[58] Field of Search ............................ 192/58 B, 82 T

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,403,757 | 9/1983 | Shepherd | 192/82 T X |
| 4,505,367 | 3/1985 | Martin | 192/58 B |
| 4,629,046 | 12/1986 | Martin | 192/58 B |
| 4,665,694 | 5/1987 | Brunken | 192/58 B |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikawa et al. | 123/41.12 |
| 4,974,713 | 12/1990 | Maus et al. | 192/58 B |
| 5,018,612 | 5/1991 | Takikawa et al. | 192/58 B |

FOREIGN PATENT DOCUMENTS

| | | |
|---|---|---|
| 55-76226 | 6/1980 | Japan . |
| 57-167533 | 10/1982 | Japan . |
| 57-179431 | 11/1982 | Japan . |
| 62-124330 | 6/1987 | Japan . |

*Primary Examiner*—Rodney H. Bonck
*Assistant Examiner*—Andrea Pitts
*Attorney, Agent, or Firm*—Anthony J. Casella; Gerald E. Hespos

[57] ABSTRACT

Herein disclosed is a temperature sensitive fluid type fan coupling apparatus which comprises: a sealed container including a casing and a cover, a partition dividing the inside of the sealed container into an oil sump and a torque transmission chamber housing the drive disc; a dam formed in a portion of such an inner circumference of the sealed container as faces the outer circumference of the drive disc, on which the oil is collected at the time of rotation; a circulation passage communicating with the dam and leading from the torque transmission chamber to the oil sump; a valve member fitted in the oil sump for opening an outflow adjusting orifice leading to the torque transmission chamber, if the ambient temperature exceeds a preset value, and closing the same if below the preset value; and a spiral temperature sensing element mounted on the front face of the cover and associated with the valve member if spirally deformed in accordance with the temperature change. The effective contact area of the oil at a torque transmission gap is increased or decreased to control the torque transmission from the rotating shaft at the drive side to the sealed container at the driven side. The output adjusting orifice is formed through a portion of the inner circumference of the cover forming the oil sump. A sealing portion for sliding in the circumferential directions to open or close the outflow adjusting orifice is formed at the leading end of the valve member.

8 Claims, 4 Drawing Sheets

TEMPERATURE SENSITIVE TYPE FLUID FAN COUPLING APPARATUS

BACKGROUND OF THE INVENTION

1. Field of the Invention

The present invention relates to an improvement in the structure of a temperature sensitive type fluid fan coupling apparatus for feeding a cooling wind to the engine of an automobile, while controlling the flow rate of the cooling wind of an engine cooling fan automatically by sensing a change in the ambient temperature uninterruptedly in accordance with the running state.

2. Description of the Prior Art

The conventional fan coupling apparatus of this kind is generally constructed, as shown of its essential portion in FIG. 6, such that a partition 25 is formed with an outflow adjusting orifice 25' leading from an oil sump 26 to a torque transmission chamber 24 and such that the outflow adjusting orifice 25' is opened or closed by the leading end of a valve member 28 fixed to a connecting rod 29 leading to a spiral temperature sensing element (although not shown) attached to the front face of a cover 23 of a sealed container to be deformed in accordance with a change in the ambient temperature.

In the temperature sensitive type fluid fan coupling apparatus having a spiral temperature sensing element, generally speaking, this temperature sensing element is formed of a long strip into a spiral shape. As a result, the temperature sensing element has its outer spiral end attached to the cover 23 so that it is vibrated by the engine or the running automobile itself. These unstable vibrations are transmitted through the connecting rod 29 to the valve member 28 to invite the so-called "fretting" between the valve member 28 and the partition 25. Thus, the sealing characteristics of the outflow adjusting orifice 25' by the leading end of the valve member 28 are deteriorated because of the position and directivity of the outflow adjusting orifice 25' in the partition 25. At the same time, the valve member 28 has its sliding face worn unbalancedly.

Because of the structure of the outflow adjusting orifice 25' in the partition 25, moreover, the lever length 1' from the fixed position of the connecting rod 29 to the outflow adjusting orifice 25' cannot be given a large value, and the sliding resistance is increased by the excessive abutting area on the surface of the partition 25 in the vicinity of the leading end of the valve member 28. As a result, the fine and precise control function by the outflow adjusting orifice 25' according to a change in the ambient temperature is lost to invite a deterioration in the responsiveness. Since, still moreover, the outflow adjusting orifice 25' is so formed inside of the outermost circumference of the oil sump 26 as to avoid the interference between the inner circumference of the oil sump 26 and the aforementioned valve member 28, the oil is fed with many air bubbles from the outflow adjusting orifice 25' to the torque transmission chamber 24. As a result, the torque is transmitted in the aerated state in the gap so that its transmission will irregularly fluctuate to make the rotational speed of the fun unstable.

SUMMARY OF THE INVENTION

The present invention has been conceived in view of the above-specified problems of the prior art and has an object to provide a temperature sensitive type fluid fan coupling apparatus which is enabled to increase or decrease the rotational speed of the fan precisely by improving the sealing characteristics of the outflow adjusting orifice even in the presence of vibrations to open or close the outflow adjusting orifice precisely and stably in accordance with a change in the ambient temperature and which is also enabled to achieve a further stabilized rotational speed of the fan by feeding the hardly aerated oil to the torque transmission chamber to prevent the irregular fluctuations of the torque transmission.

In order to achieve the above-specified object, according to the present invention, there is provided a temperature sensitive fluid type fan coupling apparatus which comprises: a sealed container including a casing and a cover, said container being borne through a bearing on a rotating shaft, which has a drive disc fixed to its leading end, and having a cooling fan attached to its outer circumference; a partition dividing the inside of said sealed container into an oil sump and a torque transmission chamber housing said drive disc; a dam formed in a portion of such an inner circumference of said sealed container as faces the outer circumference of said drive disc, on which the oil is collected at the time of rotation; a circulation passage communicating with said dam and leading from said torque transmission chamber to said oil sump; a valve member fitted in said oil sump for opening an outflow adjusting orifice leading to said torque transmission chamber, if the ambient temperature exceeds a preset value, and closing the same if below said preset value; and a spiral temperature sensing element mounted on the front face of said cover and associated with said valve member if spirally deformed in accordance with the temperature change, whereby the effective contact area of the oil at a torque transmission gap, which is formed between the opposed wall faces of said drive disc and said sealed container in the vicinity of the outside, is increased or decreased to control the torque transmission from said rotating shaft at the drive side to said sealed container at the driven side, wherein the improvement resides: in that said output adjusting orifice is formed through a portion of the inner circumference of said cover forming said oil sump; and in that a sealing portion for sliding in the circumferential directions to open or close said outflow adjusting orifice is formed at the leading end of said valve member. Moreover, the sealing member is made to have an elastic member on its sliding surface. The valve member is extended to have a length substantially equal to the diameter of the inside of the cover, and a support wall is expanded at the opposite side of the sealing portion to contact with the inner circumference of the cover loosely. The outflow adjusting orifice is recessed or tapered in the vicinity of its opening, and the sealing portion has its sliding face formed into a shape corresponding to the recess or taper. Moreover, the outflow adjusting orifice is formed into a slot extended in the circumferential or axial direction of the oil sump.

Thanks to the structure of the outflow adjusting orifice formed in the inner wall of the cover and the opening or closing structure of the sealing portion formed at the valve member apart from the surface of the partition, according to the present invention, the controls are accomplished by the circumferential displacement of the sliding motions of the sealing portion in the outflow adjusting orifice. As a result, the sealing characteristics of the outflow adjusting orifice can be made excellent even in the presence of vibrations by the position and directivity of the outflow adjusting orifice and the structure, in which the lever length from the fixed position of the connecting rod to the outflow adjusting orifice can be enlarged. The wear, which might otherwise be caused by the fretting between the valve member and the partition, can be prevented to ensure the opening or closing operation precisely and stably in accordance with a change in the ambient temperature, so that the rotational speed of the fan can be increased or decreased to exhibit the control function always finely, precisely and responsively. Thanks to the outflow adjusting orifice formed in the outermost circumference of the oil sump, the hardly aerated oil is made present in the outflow adjusting orifice by the centrifugal force applied thereto so that it can be fed to the torque transmission chamber. As a result, the transmission torque will not irregularly fluctuate in the torque transmission gap so that the so-called "hunting" phenomenon can be eliminated to improve the flow rate control function more precisely and stably.

DETAILED DESCRIPTION OF THE PREFERRED EMBODIMENTS

Figure 4A:
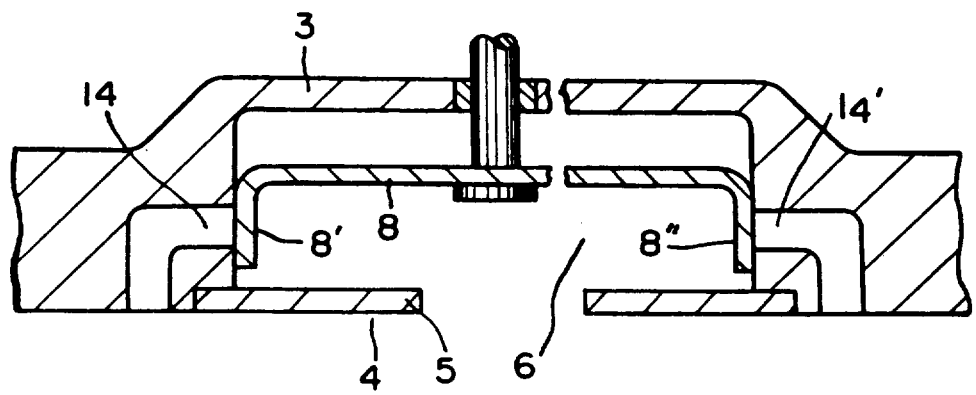
Figure 4B:
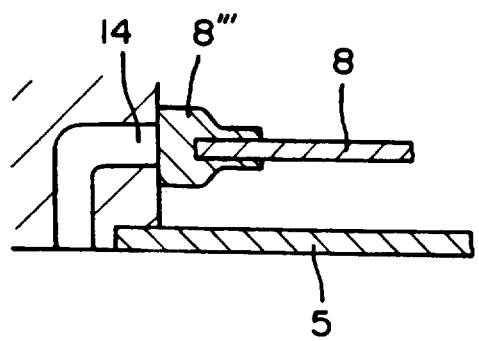
Figure 4C:
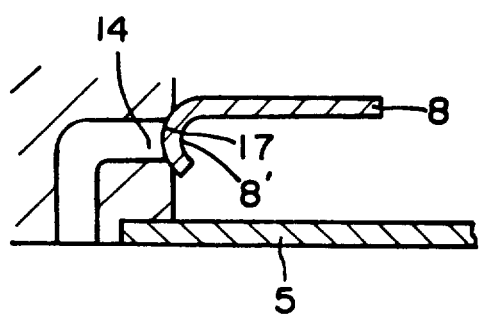
Figure 4D:
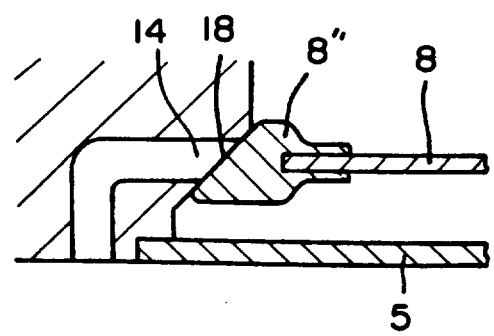
Figure 5:
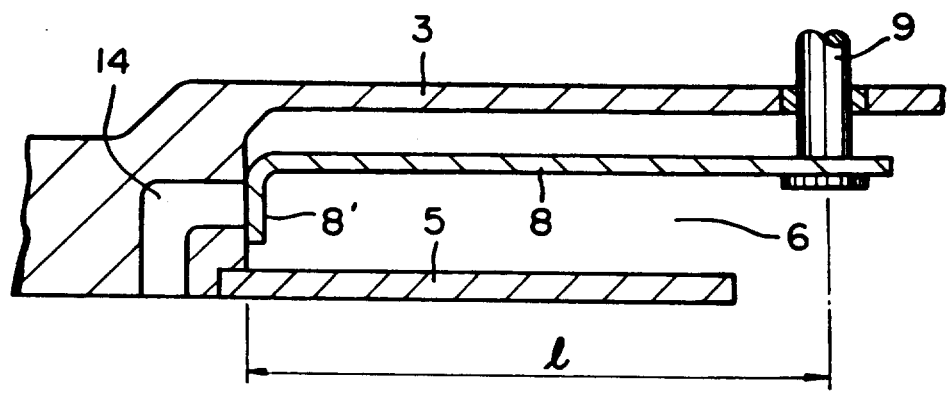
FIG. 5 is an enlarged section showing an essential portion of FIG. 1 of the present invention.
Figure 6:
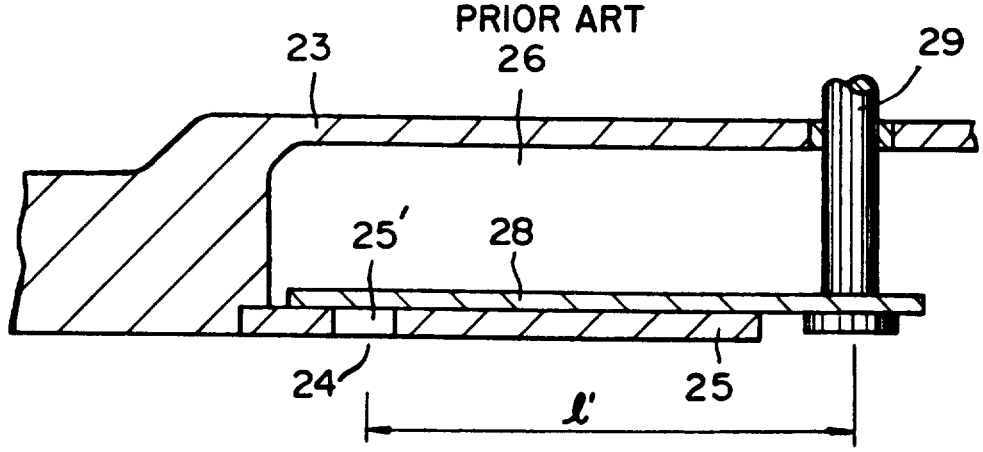
FIG. 6 is an enlarged section showing a portion in the vicinity of the outflow adjusting orifice according to the prior art.

In FIGS. 1 to 5, reference numeral 1 designates a rotating shaft acting as a drive side. This rotating shaft 1 has a drive disc 7 fixed to its leading end and bears thereon through a bearing a sealed container which has a cooling fan (although not shown) on its outer circumference and which is composed of a casing 2 and a cover 3. Numeral 5 designates a disc-shaped partition which divides the inside of the sealed container into an oil sump 6 and a torque transmission 4 for fitting the aforementioned drive disc 7 therein. Moreover, this drive disc 7 is disposed in the torque transmission chamber 4 and held at a small gap for the torque transmission from the wall opposed to it. Numeral 8 designates a valve member which is positioned at the side of the oil sump 6. This valve member 8 has its one end fixed to a connecting rod 9 and its other leading end bent at 8' to form a sealing portion. The bent wall 8' is constructed to slide circumferentially to open or close an outflow adjusting orifice 14 which is so formed in the circumferential wall of the aforementioned cover 3 as to lead to the aforementioned torque transmission chamber 4. A spiral temperature sensing element 10 is attached to the front face of the cover 3 and has its central end fixed at 11 to the aforementioned connecting rod 9. The bent wall 8' is associated with the spiral deformation of the temperature sensing element 10 according to a change in the ambient temperature to open or close the outflow adjusting orifice 14. As a result, the lever length 1 from the fixing position of the connecting rod 9 to the outflow adjusting orifice 14 in the outermost circumference can be elongated, as shown in FIG. 5, so that the valve member 8 can have its leading end highly displaced to achieve the fine and precise opening or closing function even by the slight rotation of the connecting rod 9. Numeral 12 designates a dam which is disposed in a portion of the inner circumference of the sealed container opposed to the outer circumference of the drive disc 7, in which the oil is collected by the centrifugal force of the rotations. Thus, a circulation passage 13 is formed to communicate with an inlet formed rotationally upstream of said dam and to lead from the torque transmission chamber to the oil sump 6 so that the pumping function is achieved. Numeral 15 designates a cooling fan which is mounted on the outer front face of the cover 3. Solid arrows indicate the sliding directions of the valve member 8 when in the opening and closing operations.

Figure 1:
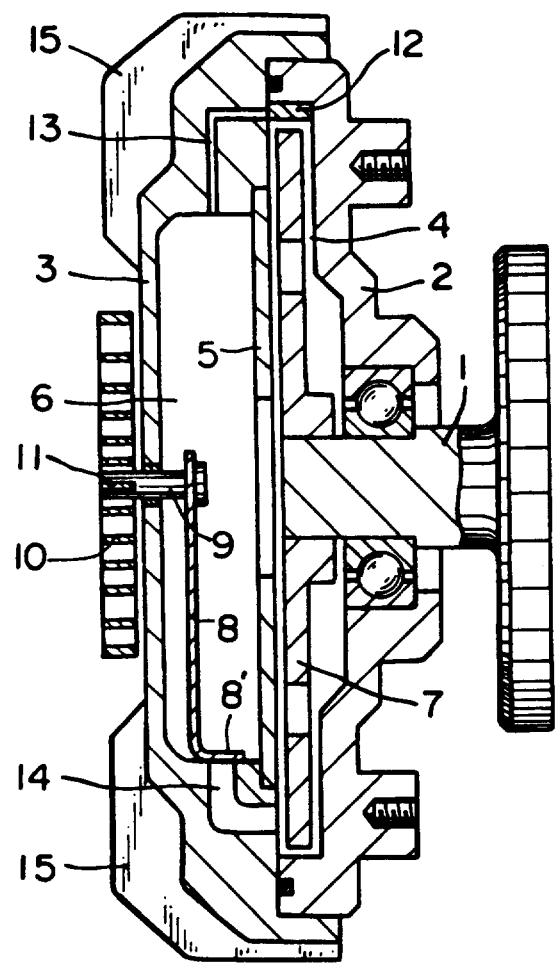
FIG. 1 is a partially cut-away longitudinal section showing a temperature sensitive type liquid fan coupling apparatus according to one embodiment of the present invention.
Figure 2A:
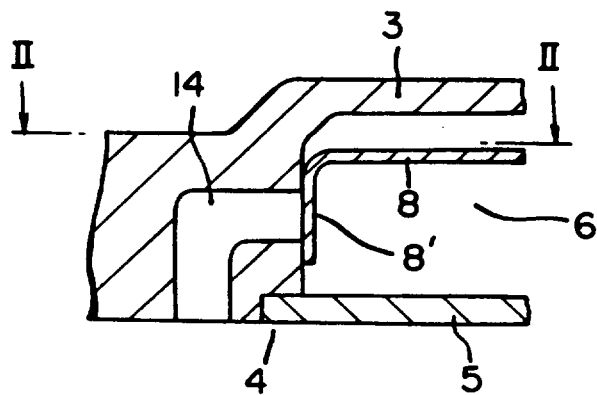
FIG. 2A is an enlarged section showing an essential portion of the embodiment FIG. 1 in the vicinity of the outflow adjusting orifice according to the present invention.
Figure 2B:
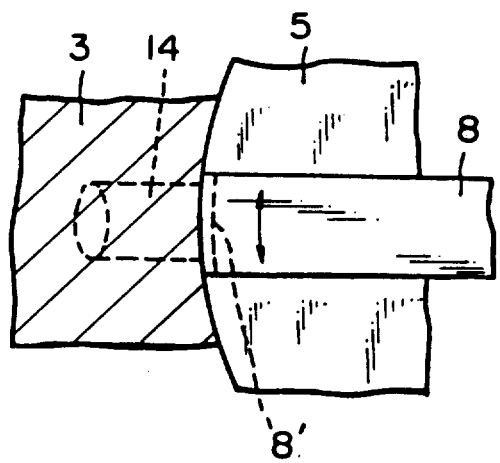
FIG. 2B is a section taken along line II—II of FIG. 2A.
Figure 3:
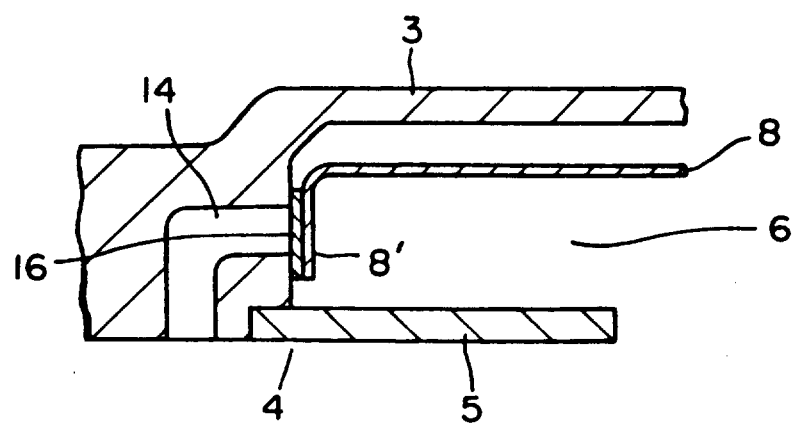
FIG. 3 and FIGS. 4A to 4D are similar to FIG. 2A but show other embodiments, respectively.

According to the present invention, as shown in FIG. 3, an elastic member 16 of polytetrafluoroethylene (PTFE) can be applied to the sliding surface of the aforementioned bent wall 8' of the valve member 8 so as to smoothen the sliding motions and improve the sealing characteristics. As shown in FIG. 4A, on the other hand, the valve member 8 may be extended to have a length substantially equal to the diameter of the inside of the cover 3 and to have a support wall 8" expanded integrally at the opposite side of the bent wall 8' so that its leading end may loosely contact with the inner circumference of the cover 3. Then, the sliding motions can be stabilized more even in the presence of the vibrations. At this time, if one or more outflow adjusting orifice 14' is formed, if necessary, and opened or closed by the aforementioned support wall 8', then the responsiveness is further improved.

In the foregoing embodiment, the sealing portion is exemplified by the bent wall 8'. As shown in FIG. 4B, however, a sealing member 8''' may be fixed on the leading end of the valve member 8. Moreover, the vibration resistance can be further improved if the circumferential wall in the cover 3 in the vicinity of the opening is recessed at 17 (as shown in FIG. 4C) or tapered at 18 (as shown in FIG. 4D) so as to cope with the axial vibrations of the valve member 8 and if the sealing portion has its sliding face formed into a shape corresponding to the recess or taper.

According to the temperature sensitive type fluid fan coupling apparatus of the present invention, as has been described hereinbefore, thanks to the structure of the outflow adjusting orifice 14 formed in the inner wall of the cover 3 and the opening or closing structure of the sealing portion composed of the bent wall 8' and the sealing member 8'' and formed at the valve member 8 apart from the surface of the partition 5, the controls are accomplished by the circumferential displacement of the sliding displacements of the sealing portion in the outflow adjusting orifice 14. As a result, the sealing characteristics of the outflow adjusting orifice 14 can be made excellent even in the presence of vibrations by the position and directivity of the outflow adjusting orifice 14 and the structure, in which the lever length from the fixed position of the connecting rod 9 to the outflow adjusting orifice 14 can be enlarged. The wear, which might otherwise be caused by the so-called "fretting" between the valve member 8 and the partition 5, can be prevented to improve the sealing characteristics, to displace the leading end of the valve member 8 highly even with a slight rotation of the control rod 9 and to ensure the opening or closing operation of the outflow adjusting orifice 14 precisely and stably in accordance with a change in the ambient temperature, so that the rotational speed of the fan can be increased or decreased to exhibit the control function always finely, precisely and responsively. Thanks to the outflow adjusting orifice 14 formed in the outermost circumference of the oil sump 6 having little aeration, the irregular fluctuations of the torque transmission through the torque transmission gap by the oil flowing out to the torque transmission chamber 4 can be reduced to stabilize the rotational speed of the fan better thereby to accomplish the flow rate control precisely and stably. If desired, moreover, the sealing characteristics can be further improved by either the elastic member 16 on the sliding surface of the sealing portion or the support wall 8" expanded to the opposite side of the sealing portion, and the sliding motions can be in a more stable state. Thus, it is possible to provide a remarkably useful temperature sensitive type fluid fan coupling apparatus which has more effective characteristics as the product.

What is claimed is:

1. A temperature sensitive fluid type fan coupling apparatus comprising: a sealed container including a casing and a cover, said container having an inner circumference and an outer circumference and being borne through a bearing on a rotating shaft, said shaft having a leading end disposed in the container, a drive disc fixed to the leading end, the drive disc having an outer circumference, and a cooling fan attached to the outer circumference of the container; a partition dividing the inside of said sealed container into an oil sump and a torque transmission chamber housing said drive disc, such that a torque transmission gap is defined between radially outer portions of the drive disc and opposed portions of the sealed container; a dam formed in a portion of the inner circumference of said sealed container and facing the outer circumference of said drive disc, on which the oil is collected at the time of rotation; a circulation passage communicating with said dam and leading from said torque transmission chamber to said oil sump; a valve member fitted in said oil sump for opening an outflow adjusting orifice leading to said torque transmission chamber, if the ambient temperature exceeds a preset value, and closing the same if below said preset value; and a spiral temperature sensing element mounted on the front face of said cover and associated with said valve member if spirally deformed in accordance with the temperature change, whereby the effective contact area of the oil at the torque transmission gap is increased or decreased to control the torque transmission from said rotating shaft to said sealed container, wherein the improvement resides: in that said outflow adjusting orifice is formed through a portion of the inner circumference of said sealed container forming said oil sump; and in that said valve member including a sealing portion for sliding in circumferential directions to open or close said outflow adjusting orifice.

2. A temperature sensitive fluid type fan coupling apparatus according to claim 1, wherein said sealing portion is made of a bent wall.

3. A temperature sensitive fluid type fan coupling apparatus according to claim 1, wherein said sealing portion is made of a sealing material.

4. A temperature sensitive fluid type fan coupling apparatus according to claim 1, wherein an elastic member is mounted on a sliding surface of said sealing portion.

5. A temperature sensitive fluid type fan coupling apparatus according to claim 1, wherein said valve member has a length substantially equal to the diameter of the inner circumference of said sealed container, said valve member having a support wall positioned diametrically opposite said sealing portion to loosely contact with the inner circumference of said sealed container.

6. A temperature sensitive fluid type fan coupling apparatus according to claim 1, wherein portions of the sealed container defining this oil sump and surrounding said outflow adjusting orifice are recessed, and wherein said sealing portion has its sliding face formed to have a shape corresponding to said recess.

7. A temperature sensitive fluid type fan coupling apparatus according to claim 1, wherein portions of said sealed container defining the oil sump and surrounding said outflow adjusting orifice are tapered, and wherein said sealing portion has its sliding face formed to have a shape corresponding to said taper.

8. A temperature sensitive fluid type fan coupling apparatus according to claim 1, wherein said outflow adjusting orifice is formed as a circumferential or longitudinal slot in said oil sump.

* * * * *